United States Patent
Chen

(10) Patent No.: US 8,314,590 B2
(45) Date of Patent: Nov. 20, 2012

(54) RECHARGEABLE BATTERY WITH USB INPUTS

(75) Inventor: Roger Chen, Yuanlin Township Changhua County (TW)

(73) Assignee: Hercules Electronics Co., Ltd., Changhua County (TW)

( * ) Notice: Subject to any disclaimer, the term of this patent is extended or adjusted under 35 U.S.C. 154(b) by 288 days.

(21) Appl. No.: 12/759,386

(22) Filed: Apr. 13, 2010

(65) Prior Publication Data

US 2011/0163712 A1 Jul. 7, 2011

(30) Foreign Application Priority Data

Jan. 5, 2010 (TW) ............................... 99200096 U
Mar. 31, 2010 (TW) ............................... 99205601 U

(51) Int. Cl.
*H01M 10/46* (2006.01)
(52) U.S. Cl. ..................................................... 320/112
(58) Field of Classification Search .................. 320/103, 320/107, 111, 112, 116; 429/96–100
See application file for complete search history.

(56) References Cited

U.S. PATENT DOCUMENTS

| 7,554,293 B2 * | 6/2009 | Horigome ...................... 320/132 |
| 2001/0045813 A1 * | 11/2001 | Suzuki et al. .................. 320/110 |

FOREIGN PATENT DOCUMENTS

JP 2002-027674 * 1/2002

* cited by examiner

*Primary Examiner* — Edward Tso
(74) *Attorney, Agent, or Firm* — Pro-Techtor Int'l Services

(57) ABSTRACT

A secondary battery includes a battery case configured subject to the configuration of a conventional 9V or 1.5V battery and a battery body and a battery charger mounted in the battery case. The battery charger controls the battery body for charging and voltage output, and provides a USB socket as charging interface and positive and negative electrodes as discharging interface. Thus, the secondary battery is connectable to a USB plug of a cell phone battery charger or computer for charging, and can be installed in an electric product like a conventional battery cell to provide DC power to the electric product. Under the provision of current detection function and voltage adjusting function, the 1.5V secondary battery can be connected in series or in parallel with one or a number of micro resistor-provided virtual batteries to output a voltage subject to its linking arrangement.

6 Claims, 7 Drawing Sheets

RECHARGEABLE BATTERY WITH USB INPUTS

BACKGROUND OF THE INVENTION

1. Field of the Invention

The present invention relates to batteries and more particularly, to a secondary battery that can be repeatedly used.

2. Description of the Related Art

A regular 9V battery is shaped as a rounded rectangular prism and has a nominal output of nine volts. 9V batteries are usually used in electroshock weapons, radio-controlled vehicle controllers, electronic instruments, microphones, smoke detectors, guitar effect units, pocket radios, and other home electric appliances. The connector (snap) of a 9V battery consists of one smaller circular (male) connector and one larger, typically either hexagonal or octagonal (female) connector for power output to an electric product using the battery.

There are known other sizes of batteries, including AAA batteries, AA batteries, C batteries and D batteries. A 1.5V battery has a cylindrical shape. Further, a 1.5V battery has the male and female connectors respectively located on the two distal ends thereof for connection to the power circuit of an electric appliance.

Conventional 9V batteries and 1.5V batteries include two types, the rechargeable type and the non-rechargeable type. A non-rechargeable battery is a primary battery, which is a disposable battery in which the electrochemical reaction is not reversible. When a primary battery is discarded after use, its internal electrolyte and other compounds may pollute the environment. A rechargeable battery is a secondary battery in which the electrochemical reaction is electrically reversible. Rechargeable batteries can offer economic and environmental benefits compared to non-rechargeable batteries, however they require specific chargers for reversing their electrochemical reactions.

Further, it is known that USB (Universal Serial Bus) connectors have bee intensively used in desk computers and notebook computers for the connection of peripheral devices such as mouse, keyboard, scanner, digital camera, printer, hard disk drive, mobile telephone, etc. Further, USB connectors include two types, namely, type A and type B for use in host and peripheral apparatus respectively. Small-sized USB connectors are known as Mini-A and Mini-B, and Micro-A and Micro-B. Mini USB has become the standard specification for cell phone charger.

On Feb. 17, 2009, the GSMA announced that they are committed to implementing a cross-industry standard for a universal charger for new mobile phones, and have set an ambitious target that by 2012 a universal charging solution (UCS) will be widely available in the market worldwide and will use Micro-USB as the common universal charging interface.

The inventor found that integrating a battery body for rechargeable battery, a charger and a USB connector into a battery case can constitute a secondary battery rechargeable by a cell phone battery charger or computer and usable like a conventional battery.

SUMMARY OF THE INVENTION

The present invention has been accomplished under the circumstances in view.

It is one object of the present invention to provide a secondary battery, which comprises a battery case configured subject to the shape of a conventional battery, and a battery body and a battery charger mounted in the battery case, wherein the battery charger controls the battery body for charging and voltage output and provides a USB socket as charging interface and positive and negative electrodes as discharging interface. Thus, the secondary battery is connectable to a USB plug of a cell phone battery charger or computer for charging, and can be installed in an electric product like a conventional battery to provide DC power to the electric product.

It is another object of the present invention to provide a secondary battery, which comprises a current detection circuit and voltage adjusting circuit, and is electrically connectable in series or in parallel with one or a number of micro resistor-provided virtual batteries to output a voltage subject to the linking arrangement.

When compared to a conventional secondary battery, the invention integrally arrange a battery body, a battery charger and a USB socket in a battery case that is configured subject to the shape of a conventional battery, so that the second battery of the present invention can be directly charged by a cell phone battery charger or computer without any specific battery charger. Therefore, the invention fully utilizes resources, saves much charging expensive, and can offer economic and environmental benefits.

Further, the secondary battery of the invention can be connected in series or in parallel with at least one virtual battery for application, saving the cost.

Other and further benefits, advantages and features of the present invention will be fully understood by reference to the following specification in conjunction with the accompanying drawings.

DETAILED DESCRIPTION OF THE PREFERRED EMBODIMENT

Figure 1:
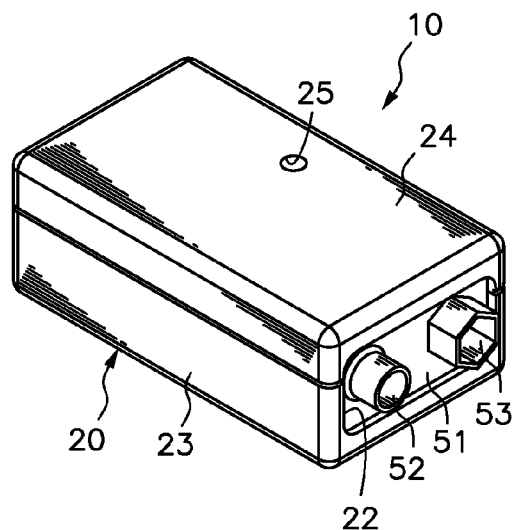
FIG. 1 is a perspective view of a secondary battery in accordance with the present invention.
Figure 2:
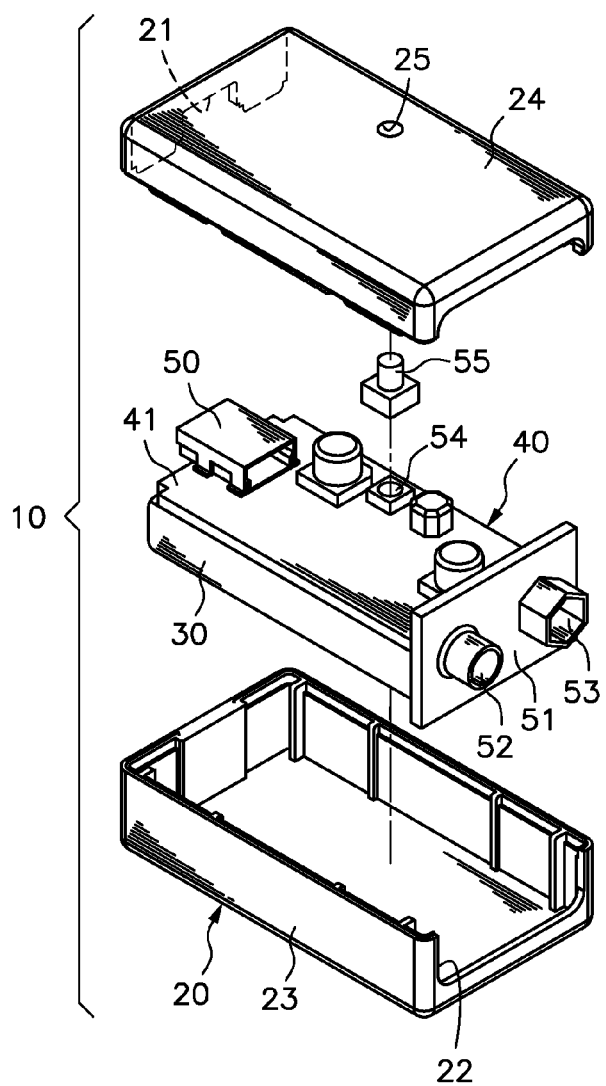
FIG. 2 is an exploded view of the secondary battery shown in FIG. 1.

Referring to FIGS. 1 and 2, a secondary battery 10 in accordance with the present invention is shown comprising a battery case 20, a battery body 30 and a battery charger 40.

The battery case 20 is shaped as a rounded rectangular prism like a regular 9V battery, and adapted for accommodating the battery body 30 and the battery charger 40. The battery case 20 has a window 21 and an opening 22 respectively located on the two distal ends thereof. The functions of the window 21 and the opening 22 will be discussed later. To facilitate installation, the battery case 20 consists of a first cover shell 23 and a second cover shell 24.

The battery body 30 is accommodated in the battery case 20, and adapted for receiving a voltage for charging and outputting a voltage when discharging. The battery body 30 is preferably a Li-polymer battery cell that can offer the benefits of no size limit, light weight and safe compared to conventional Li-ion battery cells for cell phone.

Figure 3:
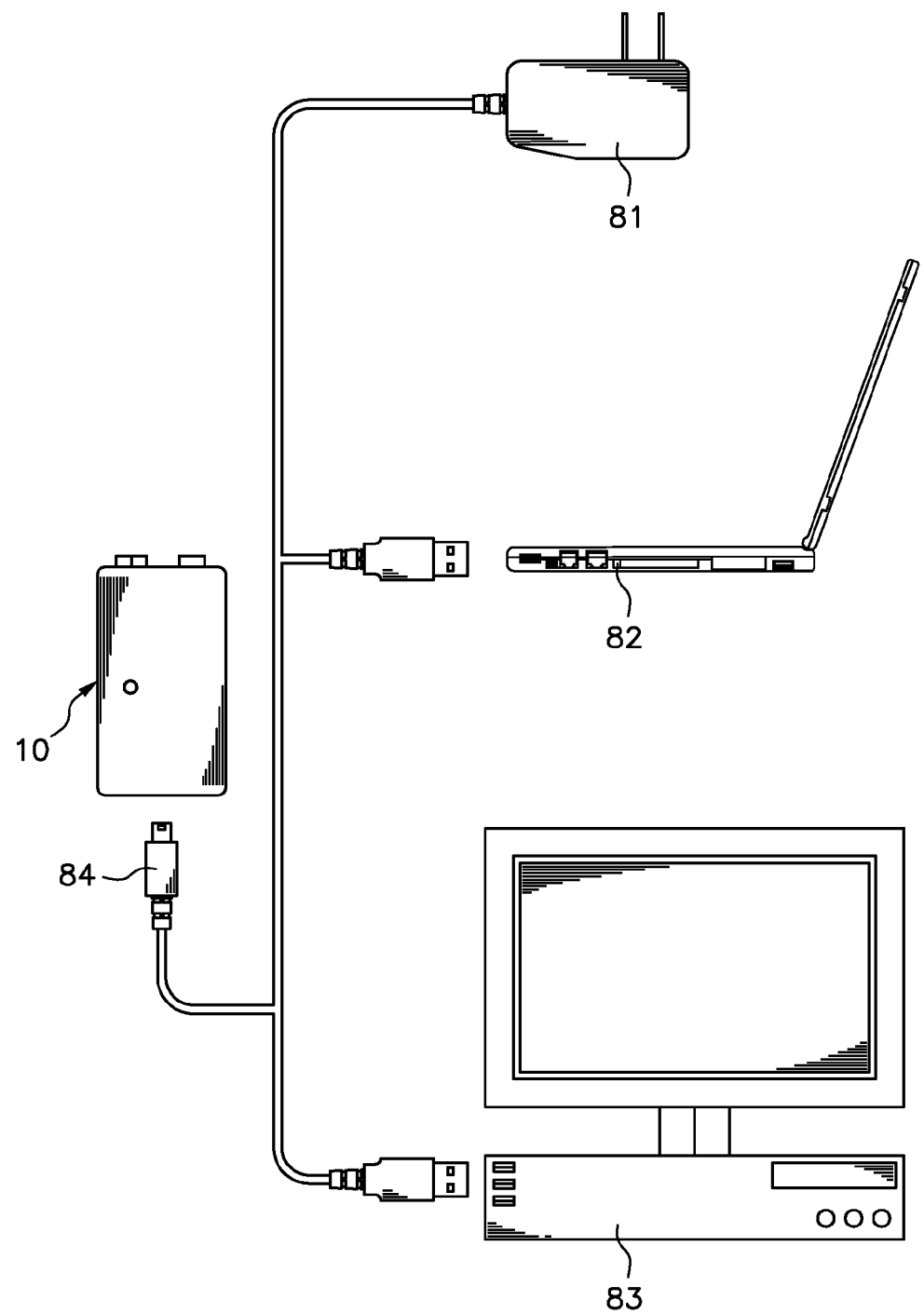
FIG. 3 is a schematic drawing of the present invention, showing a charging arrangement of the secondary battery.

The battery charger 40 is mounted in the battery case 20 and electrically connected to the battery body 30. The battery charger 40 comprises a charging circuit 42, a voltage booster circuit 43 and a voltage regulator circuit 44 arranged subject to a predetermined circuit logic (see FIG. 4) on a circuit board 41 for controlling charging and voltage output of the battery body 30. The battery charger 40 further comprises a USB socket 50 mounted in one end of the circuit board 41 as a charging interface, and an electrode plate 51 located on the other end of the circuit board 41 as a discharging interface. The USB socket 50 faces the window 21 of the battery case 20 for the insertion of a USB plug 84 of an external power source 80, which can be a cell phone battery charger 81, notebook computer 82 or desk computer 83 (see FIG. 3), to charge the battery body 30. The electrode plate 51 has a positive electrode 52 and a negative electrode 53 projecting through the opening 22 to the outside of the battery case 20 for connection to an electric appliance to provide the electric appliance with the necessary DC power. The USB socket 50 can be a standard USB socket, or preferably a Mini USB socket or Micro USB socket. The battery charger 40 further comprises an indicator light 54 capable of giving off different colors of light during charging and after charging completed, and a light guide 55 mounted in a through hole 25 on the battery case 20 for guiding emitted light from the indicator light 54 to the outside of the battery case 20 to give a visual signal indicative of the charging status. Further, the locations of the window 21 at the battery case 20 and the location of the USB socket 50 at the circuit board 41 may be changed, for allowing insertion of a USB plug 84 through another side of the battery case 20 beyond the rear end.

Figure 4:
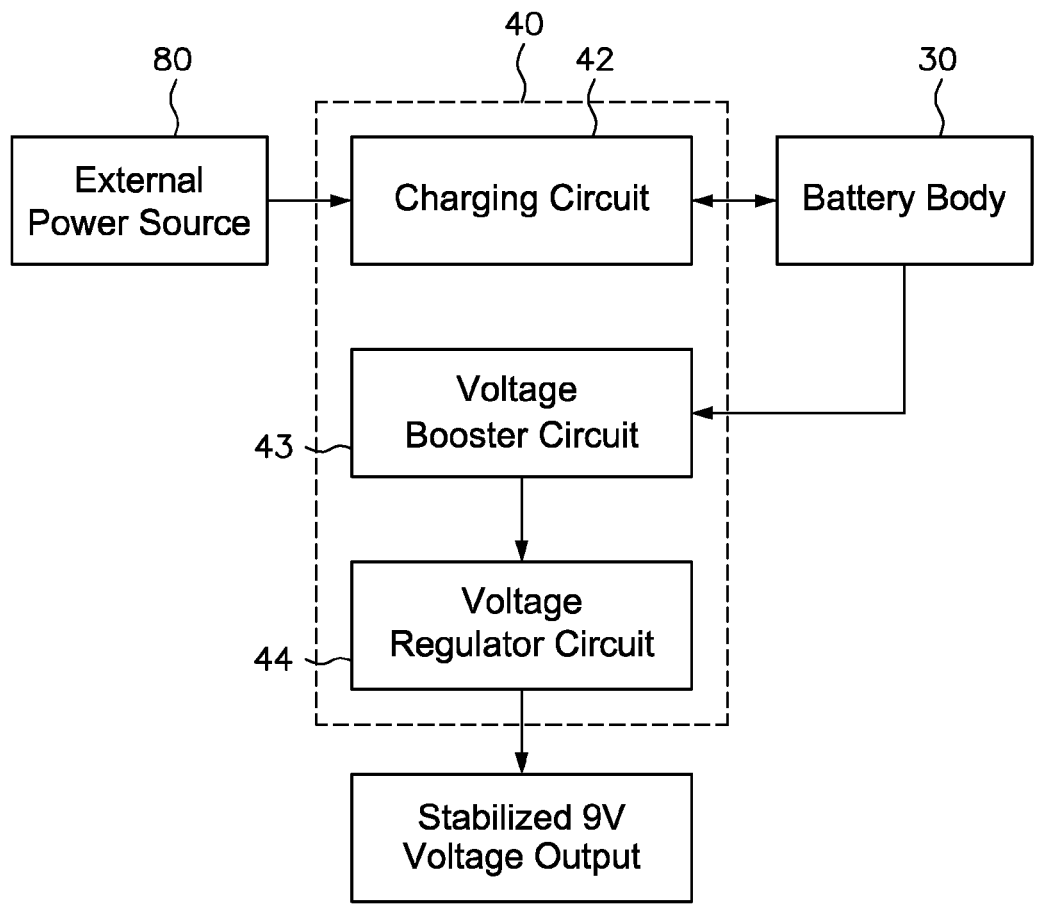
FIG. 4 is a circuit block diagram of the secondary battery shown in FIG. 1.

Referring to FIG. 4, after connection of the secondary battery 10 to an external cell phone battery charger or computer, the battery body 30 is charged by the charging circuit 42 with the external power source 80. When charging is completed, the voltage booster circuit 43 boosts the voltage (about 3.6V) of the battery body 30 to 9V, and the voltage regulator circuit 44 stabilizes the voltage for output so that stabilized DC power can be provided to an electric product. Further, the charging circuit 42 detects the voltage level of the battery body 30 during charging, and automatically breaks the circuit when the temperature surpasses a predetermined range or a predetermined charging time is over, thereby protecting the battery body 30. These protection techniques are of the known art, no further detailed description in this regard is necessary.

Because the 9V secondary battery 10 provides the USB socket 50 as a charging interface and the electrode plate 51 as a discharging interface, a user can charge the 9V secondary battery 10 directly with a cell phone battery charger or computer by means of inserting a USB plug 84 of the cell phone battery charger or computer into the USB socket 50 without any extra battery charger. Therefore, the invention fully utilizes resources, saves much charging expensive, and can offer economic and environmental benefits. When connecting the positive electrode 52 and negative electrode 53 of the secondary battery 10 to an electric product according to a standard connection method, the secondary battery 10 provides electricity to the electric product.

Figure 5:
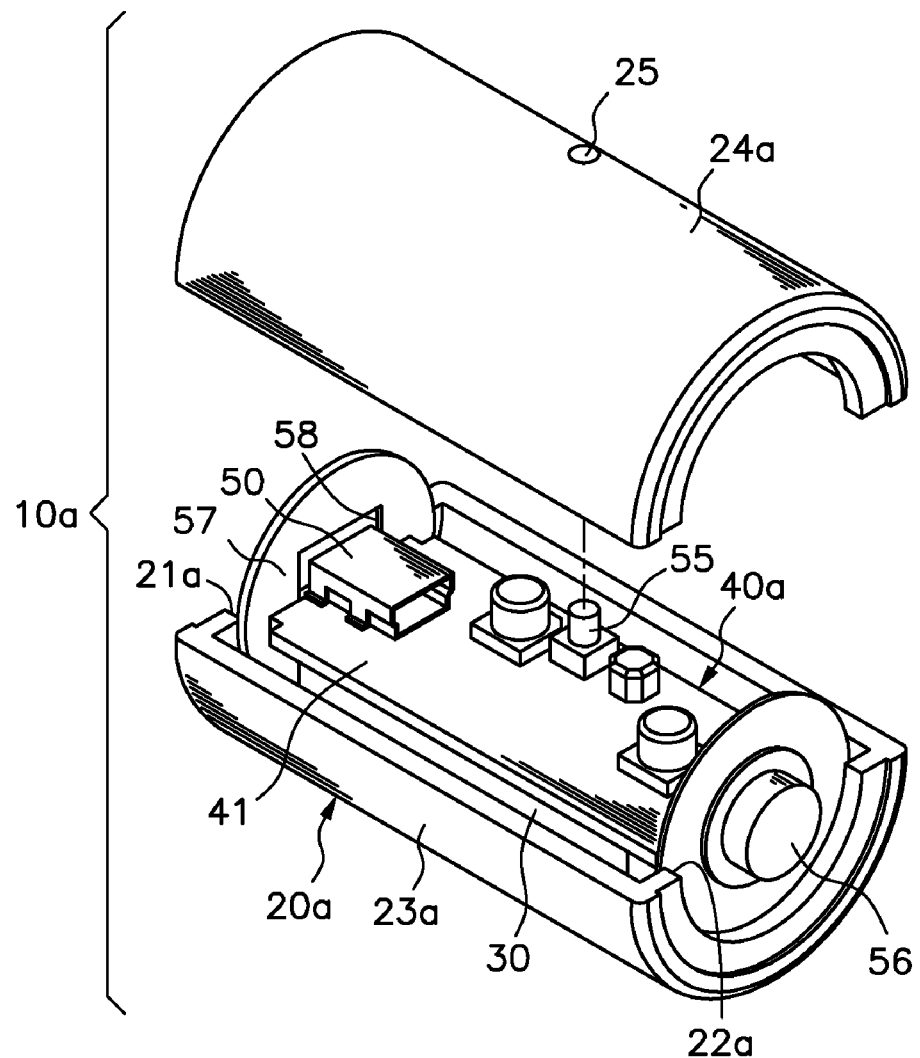
FIG. 5 is an exploded view of an alternate form of the secondary battery in accordance with the present invention.
Figure 6:
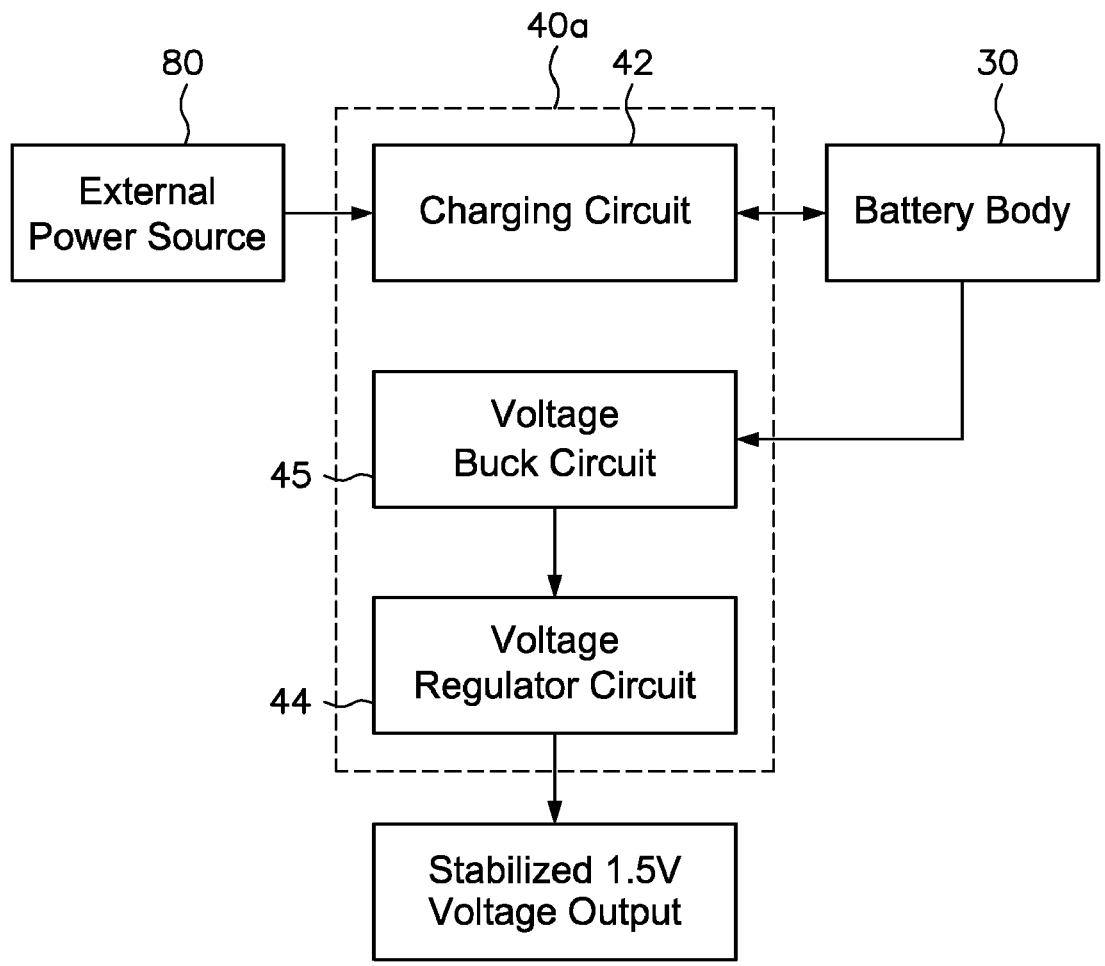
FIG. 6 is a circuit block diagram of the secondary battery shown in FIG. 5.

Referring to FIGS. 5 and 6, the 9V secondary battery 10 may be modified into a 1.5V secondary battery 10a equivalent to a conventional AAA, AA, C or D battery to fit different requirements for different electric products. Unlike the rectangular prism-like shape of the battery case 20, the battery case 20a of the 1.5V secondary battery 10a has a cylindrical shape. Further, the battery case 20a has a first opening 21a at its one end and a second opening 22a at its opposite end. The positive electrode 56 and negative electrode 57 of the battery charger 40a are respectively arranged at the two distal ends of the circuit board 41. The positive electrode 56 projects through the second opening 22a to the outside of the battery case 20a. The negative electrode 57 faces the first opening 21a, having a window 58 corresponding to the USB socket 50 so that a USB plug of a cell phone battery charger or computer can be inserted through the window 58 into the USB socket 50 for charging the battery body 30. The cylindrical battery case 20a also consists of a first cover shell 23a and a second cover shell 24a. Further, the window 58 may be arranged at the positive electrode 56 or the periphery of the battery case 20a. In this case, the location of the USB socket 50 must be relatively changed. Because the voltage of a standard cylindrical battery is 1.5V, a voltage buck circuit 45 is used to step down the voltage of the battery body 30 to 1.5V for output through the voltage regulator circuit 44. For easy understanding, like reference numbers denote like elements of structure across the aforesaid two embodiments. The description for the 9V secondary battery 10 is applicable to the 1.5V secondary battery 10a.

Figure 7:
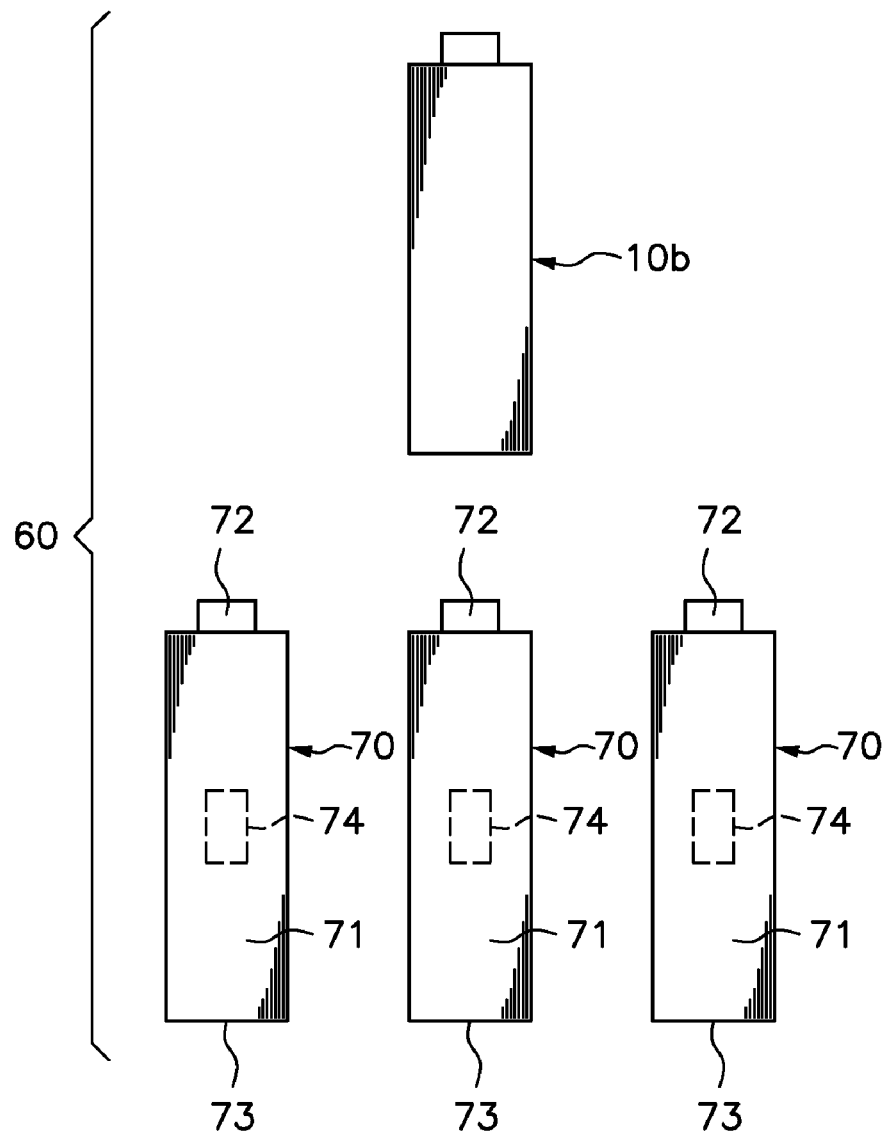
FIG. 7 is a plain view of a secondary battery assembly in accordance with the present invention.
Figure 8:
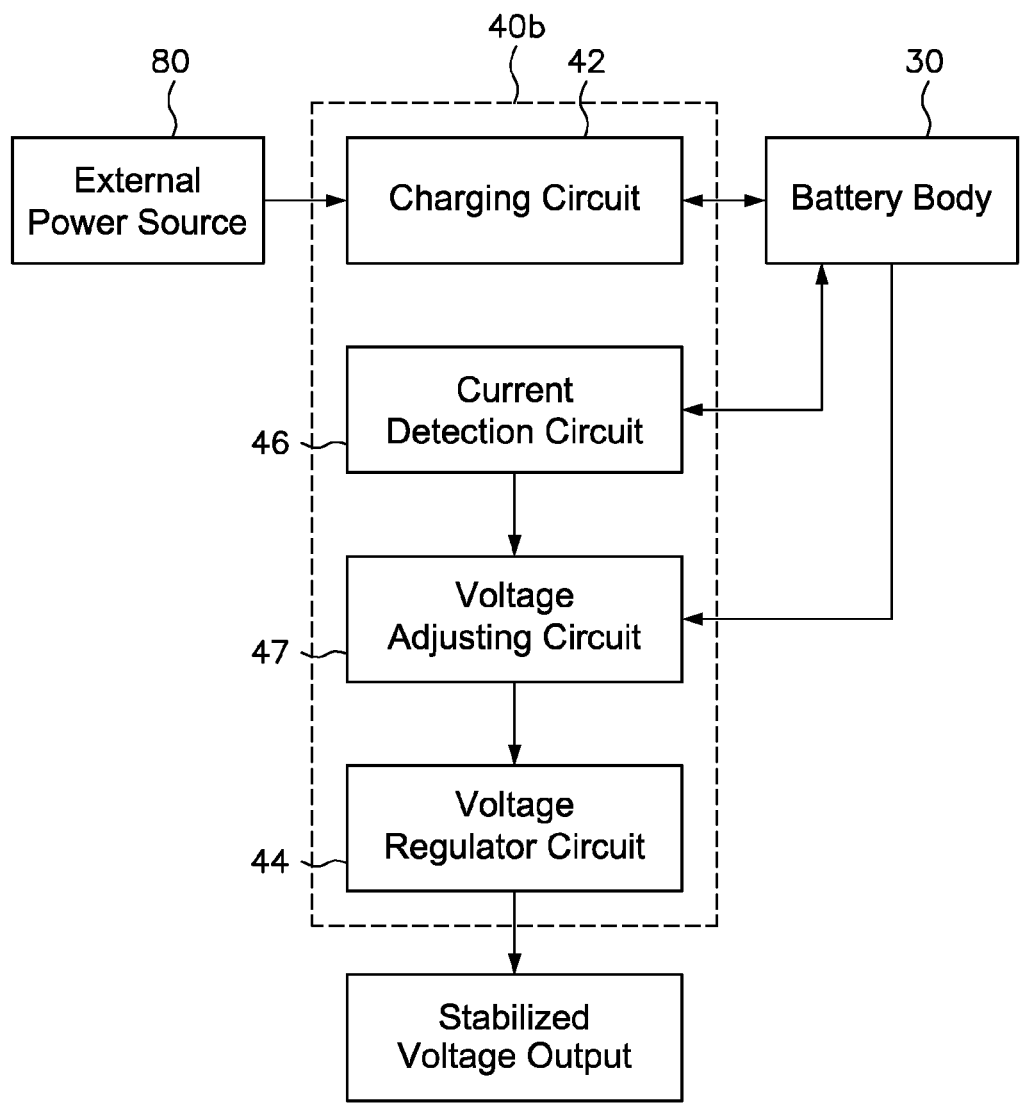
FIG. 8 is a circuit block diagram of the secondary battery assembly shown in FIG. 7.

Further, two or more 1.5V batteries may be connected in series or in parallel to get more power/load, enabling, for example, the lamp to emit more light or for a more longer period of time. However, it is not economic to connect 1.5V secondary batteries 10a in series or in parallel for application. For the sake of cost saving, the invention provides a secondary battery assembly 60. As shown in FIGS. 7 and 8, the secondary battery assembly 60 comprises a secondary battery 10b and at least one virtual battery 70. The secondary battery 10b is substantially similar to the aforesaid 1.5V secondary battery 10a with the exception that the battery charger 40b further comprises a current detection circuit 46 and a voltage adjusting circuit 47. Each virtual battery 70 simply comprises a cylindrical battery case 71 configured subject to a regular 1.5V battery, a positive electrode 72 and a negative electrode 73 respectively located on the two distal ends of the cylindrical battery case 71, and a micro resistor 74 connected in series between the positive electrode 72 and the negative electrode 73 as a current sensing element. The at least one virtual battery 70 does not have the function of a regular battery to convert chemical energy into electric energy.

During the use of the aforesaid secondary battery assembly 60, one secondary battery 10b and one or a number of virtual batteries 70 are connected in series or in parallel. The number of virtual batteries 70 is determined subject to the power requirement of the electronic product. At this time, subject to Ohm's law that the current through a conductor between two points is directly proportional to the potential difference or voltage across the two points, and inversely proportional to the resistance between them. Thus, the current detection circuit 46 can detect the volume of the electric current passing through the micro resistor 74 of each virtual battery 70 and add the detected signal to the voltage adjusting circuit 47 for enabling the voltage adjusting circuit 47 to adjust the voltage to the level of 1.5V, 3V, 4.5V, 6V or 9V that fits the link of the secondary battery 10b and the at least one virtual battery 70. The adjusted DC voltage is then outputted through the voltage regulator circuit 44 into the connected electric product. Because the cost of one virtual battery 70 is much lower than the secondary battery 10b, using the secondary battery 10b with one or a number of virtual batteries 70 can greatly reduce the cost and yield economic benefits.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A secondary battery, comprising:
   a battery case shape like a conventional battery, said battery case having a window, and an opening at at least one of two distal ends thereof;
   a battery body mounted in said battery case and adapted for receiving a voltage for charging and outputting a voltage during discharging;
   and
   a battery charger mounted in said battery case and adapted for controlling said battery body for charging and voltage output, said battery charger comprising a USB socket facing said window and a positive electrode and a negative electrode exposed out of said opening;
   and wherein said battery body is a Li-polymer battery cell;
   and wherein said USB socket is selected from a group consisting of Mini USB socket and Micro USB socket;
   and wherein said battery charger further comprises an indicator light adapted for indicating the charging status of said battery body, and a light guide mounted in a hole on said battery case for guiding the emitted light from said indicator light to the outside of said battery case;
   and wherein said battery case has a rounded rectangular prism-like shape configured subject to a conventional 9V battery; said battery charger further comprises an electrode plate disposed at one end thereof and carrying said positive electrode and said negative electrode in such a position that said positive electrode and said negative electrode project to the outside of said battery case through said opening.

2. The secondary battery as claimed in claim 1, wherein said battery charger further comprises a voltage booster circuit adapted for boosting the voltage of said battery body to 9V, and a voltage regulator circuit adapted for stabilizing the 9V voltage boosted by said voltage booster circuit for output.

3. The secondary battery as claimed in claim 1, wherein said battery case has a cylindrical shape configured subject to a conventional 1.5V battery, and an opening at each of the two distal ends thereof; said positive electrode and said negative electrode of said battery charger respectively are exposed to the outside of said battery case through the two openings at the two distal ends of said battery case.

4. The secondary battery as claimed in claim 3, wherein said battery charger further comprises a voltage buck circuit adapted for step down the voltage of said battery body to 1.5V, and a voltage regulator circuit adapted for stabilizing the 1.5V voltage processed by said voltage buck circuit for output.

5. The secondary battery as claimed in claim 3, further comprising at least one virtual battery selectively connected in series or in parallel to the assembly of said battery case, said battery body and said battery charger to form a secondary battery assembly, each said virtual battery comprising a cylindrical battery case configured subject to a regular 1.5V battery, a positive electrode and a negative electrode respectively located on two distal ends of said cylindrical battery case and a micro resistor connected in series between the positive electrode and negative electrodes of the respective virtual battery as a current sensing element; said battery charger further comprises a current detection circuit adapted for detecting the volume of the electric current passing through said micro resistor of each said virtual battery and a voltage adjusting circuit adapted for adjusting the voltage of said battery body subject to the link of the secondary battery and the at least one virtual battery.

6. The secondary battery as claimed in claim 5, wherein said battery charger further comprises a voltage regulator circuit adapted for stabilizing the voltage adjusted by said voltage adjusting circuit for output.

\* \* \* \* \*